Patented Aug. 1, 1933

1,920,254

UNITED STATES PATENT OFFICE 1,920,254

PYROTECHNIC COMPOSITION FOR PRODUCING YELLOW SMOKE

George U. Graff, Washington, D. C.

No Drawing. Application January 18, 1933
Serial No. 652,430

5 Claims. (Cl. 52—24)

(Granted under the Act of March 3, 1883, as
amended April 30, 1928; 370 O. G. 757)

This invention relates to a pyrotechnic composition for producing yellow smoke and has for its object to provide a composition that will evolve an abundance of deeply colored smoke of the color specified.

With the above and other objects in view, this invention consists in the construction, combination and arrangement of parts as will be described more fully hereinafter.

I have found that the above mentioned object may be attained by mixing potassium bichromate, magnesium and an oxygen-yielding salt of bismuth in suitable proportions.

One substance well adapted to produce yellow smoke is: potassium bichromate 66 parts, bismuth tetroxide 20 parts, magnesium 14 parts; that is, the ingredients are substantially in the proportion 13:4:2, respectively.

Another substance that gives the same result is: potassium bichromate 65 parts, bismuth subnitrate 20 parts, and magnesium 15 parts, the proportions having approximately the same relation as above given.

The compositions specified gives off puffs of yellow smoke that are particularly adapted for use in daylight fireworks and various daylight signaling devices, though the application of this invention is not limited to the purposes specified.

It is to be understood that the proportions specified for the several ingredients represent the preferred percentages for each combination but that strict adherence thereto is not essential, as good results are obtained even when they are varied within considerable limits.

The herein described invention may be manufactured and used by or for the Government of the United States for governmental purposes without the payment of any royalty thereon.

I claim:

1. A pyrotechnic composition for producing yellow smoke, comprising potassium bichromate 66 parts, bismuth tetroxide 20 parts, and magnesium 14 parts.

2. A pyrotechnic composition for producing yellow smoke, comprising potassium bichromate 65 parts, bismuth subnitrate 20 parts, and magnesium 15 parts.

3. A pyrotechnic composition for producing yellow smoke, comprising potassium bichromate, bismuth tetroxide, and magnesium, substantially in the proportions 13:4:3.

4. A pyrotechnic composition for producing yellow smoke, comprising potassium bichromate, bismuth subnitrate and magnesium, substantially in the proportions 13:4:3.

5. A pyrotechnic composition for producing yellow smoke, comprising potassium bichromate, an oxygen-yielding salt of bismuth and magnesium substantially in the proportions of 13:4:3, respectively.

GEORGE U. GRAFF.